United States Patent Office 3,092,449
Patented June 4, 1963

3,092,449
PROCESS FOR THE RECOVERY OF EUROPIUM FROM LOW GRADE EUROPIUM MIXTURES WITH OTHER RARE EARTHS
Kazimierz Jozef Bril, Rua 4, 89 Jardim Elvira, Santo Amaro, and Jose Behmoiras Madjar, Av. Adolfo Pinheiro, 4036 Bloco G, Apto. 12, both of Sao Paulo, Brazil
No Drawing. Filed July 13, 1959, Ser. No. 826,495
Claims priority, application Brazil July 22, 1958
6 Claims. (Cl. 23—22)

The trivalent europium ion can be easily reduced to the bivalent state whose chemical properties are radically different from the trivalent rare earth ions. Methods of separation and purification of europium salts are, in general, based upon that difference and on the relative stability of the europous ion. For instance, europium can be reduced and then precipitated as europous sulfate, the solubility of which is much lower than the solubility of the trivalent rare earth sulfates. This method, however, cannot be applied directly to low grade europium mixtures with other rare earths as naturally occurring, for instance in monazite; the solubility of the europous sulfate is not low enough to allow in such a case direct precipitation of europous sulfate. It is known that the sulfates of some bivalent metals, like strontium and barium, are isomorphic with europous sulfate and that europous sulfate can be coprecipitated with a sulfate of such a metal. Although widely used, this coprecipitation process presents serious technical and economical difficulties during the recovery of the coprecipitated europous sulfate. Furthermore the yield of this coprecipitation process rarely exceeds 90%.

We found, and this is the principal object of this invention, that europous sulfate can be coprecipitated from sulfate solutions using rare earths alkali double sulfates as coprecipitating agents. This fact could by no means be foreseen, since the rare earths alkali double sulfates are not known to be isomorphic with europous sulfate.

According to the present invention a solution of rare earths sulfates containing europium is, under exclusion of oxygen, reduced at a pH between 1 and 2.5 with zinc dust. The concentration of the rare earths sulfates solution may be 50–75 grams of rare earth oxides per liter. The quantity of zinc dust necessary for complete reduction of the europium varies between 2 and 4 grams per liter. Sodium or potassium sulfate is then added to the solution. The europous sulfate coprecipitates with the rare earths double alkali sulfates. In an alternative embodiment of this invention the alkali sulfate may be added simultaneously with the reducing agent. The amount of rare earths double alkali sulfates to be precipitated depends upon the composition of the rare earth mixture and on the desired degree of recovery of the europium. For rare earth mixtures such as occur in monazite, precipitation of between 5 and 10% of the rare earths originally present in the solution is sufficient to coprecipitate 95 to 99% of the europium originally present. This process thus gives in one operation an enrichment factor for europium of 10 to 20.

The rare earths double alkali sulfates so obtained and containing 95–99% of the europium originally present, can now be easily transformed into hydroxides or carbonates. According to another embodiment of this invention the carbonates or hydroxides are dissolved in sulfuric acid, the pH of the solution is adjusted to between 1 and 2.5, the solution is reduced with zinc dust and again 5–10% of the rare earths are precipitated in the form of double alkali sulfates by addition of an alkali sulfate. The process can be repeated until the desired grade of europium enrichment in the rare earths double alkali sulfates is obtained.

The presence of heavy metals, like copper and lead, in the original rare earths sulfate solution may render difficult or even prevent the reduction of europium. These undesirable materials, if present, should be removed before performing the reduction of europium. This can be realized by pretreating the rare earths sulfate solution with a small amount of zinc dust until the interfering metals deposit upon the zinc. The solution now free from heavy metals is decanted from the metallic residue and submitted to the process of the present invention.

As an illustrative embodiment of a manner in which the invention may be practiced, the following examples are presented.

Example I 46 kg. of oxides of rare earths, obtained by an alkaline attack of monazite and containing about 0.05% of europium oxide, are dissolved in 2 M sulfuric acid and the solution is diluted to a volume of 700 liters; free acidity is adjusted to 0.08 N. 350 g. of zinc dust are added and the suspension is agitated for two hours. The solution, now free of heavy metals, is decanted from the metallic residue, and placed in a closed, enamelled vessel with a capacity of 800 liters, equipped with an agitator. Carbon dioxide is allowed to bubble through the solution for half an hour in order to remove oxygen; 2000 g. of zinc dust are added and, immediately afterwards, a solution of 2000 g. of anhydrous sodium sulfate in 10 liters of water. The system is agitated during two hours in an atmosphere of carbon dioxide, at a temperature between 30 and 35 C. Thereafter the rare earths alkali double sulfates are recovered by filtration. They contain a total of 4340 g. rare earths oxides with 0.44% europium oxide. The rare earths remaining in the filtrate contain less than 0.002% of europium oxide, calculated on oxide basis.

This corresponds to an europium recovery of about 96%.

Example II

The rare earths alkali double sulfates obtained in Example I are treated with a solution of sodium carbonate, and the carbonates thus obtained are filtered, washed and dissolved in sulfuric acid; the volume of the solution is adjusted to 66 liters and the pH is adjusted to 1.5. After addition of 45 g. of zinc dust and two hours of agitation, the metallic residue is separated from the solution by filtration. The solution is placed in an enamelled container (as described in Example I) with a capacity of 100 liters, and carbon dioxide is allowed to bubble through the solution for half an hour. 200 g. of zinc dust and right afterwards 230 g. of anhydrous sodium sulfate dissolved in a liter of water, are added. After four hours of agitation, the rare earths alkali double sulfates are filtered. They contain 385 g. of rare earths oxides with 4.9% of europium oxide. The rare earths remaining in the filtrate contain 0.014% of europium, calculated on oxide basis. This corresponds to an europium recovery of about 97%.

Having described our invention, what is claimed is:

1. In a method of recovering europium values from low grade europium-containing mixtures with other rare earths wherein the amount of europium values is small relative to the other rare earths, the steps of adding an alkali metal sulfate selected from the group consisting of sodium sulfate and potassium sulfate to a solution in which the solubility of europous sulfate is not sufficiently low for a substantial portion of europous sulfate to precipitate therefrom, said solution containing rare earth sulfates and europium values in europous form in an amount sufficient to precipitate part of said rare earths in the form of rare earth-alkali metal-double sulfates, thereby coprecipitating said europium values in the form of europous sulfate with said part of said rare earth-alkali metal-double sulfates; and recovering a product containing an increased percentage of europium values as compared to the percentage of europium values in said original europium-containing mixture.

2. In a method of recovering europium values from low grade europium-containing mixtures with other rare earths wherein the amount of europium values is small relative to the other rare earths, the steps of treating a solution of rare earth sulfates in which the solubility of europous sulfate is not sufficiently low for a substantial portion of europous sulfate to precipitate therefrom, said solution containing europium values and being at a pH of 1–2.5 and being substantially free of heavy metals which interfere with the reduction by zinc dust of europium to the europous state with zinc dust so as to reduce said europium values to europous form; adding an alkali metal sulfate selected from the group consisting of sodium sulfate and potassium sulfate in an amount sufficient to precipitate part of said rare earths in the form of rare earth-alkali metal-double sulfates, thereby coprecipitating said europium values in the form of europous sulfate with said part of said rare earth-alkali metal-double sulfates; and recovering a product containing an increased percentage of europium values as compared to the percentage of europium values in said original europium-containing mixture.

3. In a method of recovering europium values from low grade europium-containing mixtures with other rare earths wherein the amount of europium values is small relative to the other rare earths, the steps of treating at a pH of 1–2.5 a solution of rare earth sulfates in which the solubility of europous sulfate is not sufficiently low for a substantial portion of europous sulfate to precipitate therefrom, said solution having a concentration of rare earth sulfates equivalent to 50–75 grams of rare earth oxides per liter and containing europium values and also containing heavy metal values which interfere with the reduction of europium to europous form with zinc dust in an amount sufficient to reduce said heavy metal values, thereby depositing said heavy metal values on said zinc to form a metallic residue; separating the thus obtained solution from the remaining metallic residue; treating the thus separated solution with zinc dust in an amount of between 2 and 4 grams per liter of solution so as to reduce said europium values to europous form and with an alkali metal sulfate selected from the group consisting of sodium sulfate and potassium sulfate in an amount sufficient to precipitate between 5 and 10% of said rare earths in the form of rare earth-alkali metal-double sulfates, thereby precipitating said part of said rare earths in the form of rare earth-alkali metal-double sulfates and, thereby coprecipitating said europium values in the form of europous sulfate with said part of said rare earth-alkali metal-double sulfates; and recovering a product containing an increased percentage of europium values as compared to the percentage of europium values in said original europium-containing mixture.

4. In a method of recovering europium values from low grade europium-containing mixtures with other rare earths wherein the amount of europium values is small relative to the other rare earths, the steps of adding an alkali metal sulfate selected from the group consisting of sodium sulfate and potassium sulfate to a solution in which the solubility of europous sulfate is not sufficiently low for a substantial portion of europous sulfate to precipitate therefrom, said solution containing rare earth sulfates and europium values in europous form in an amount sufficient to precipitate part of said rare earths in the form of alkali metal double sulfates, thereby coprecipitating said europium values in the form of europous sulfate with said part of said rare earth-alkali metal-double sulfates; transforming said rare earth-alkali metal-double sulfates precipitate containing the europium values into acid soluble compounds selected from the group consisting of hydroxides and carbonates; dissolving said compounds in sulfuric acid; forming therefrom a solution of rare earth sulfates having a pH between 1 and 2.5 and a concentration of 50–75 grams of rare earth oxides per liter and being substantially free of heavy metals which interfere with the reduction by zinc dust of europium to the europous state; and treating said solution with zinc dust in an amount of between 2 and 4 grams per liter of solution so as to reduce said europium values to europous form and with an alkali metal sulfate selected from the group consisting of sodium sulfate and potassium sulfate in an amount sufficient to precipitate between 5 and 10% of said rare earths in the form of rare earth-alkali metal-double sulfates, thereby precipitating said part of said rare earths in the form of rare earth-alkali metal-double sulfates and, thereby coprecipitating said europium values in the form of europous sulfate with said part of said rare earth-alkali metal-double sulfates; and recovering a product containing an increased percentage of europium values as compared to the percentage of europium values in said original europium-containing mixture.

5. In a method of recovering europium values from low grade europium-containing mixtures with other rare earths wherein the amount of europium values is small relative to the other rare earths, the steps of treating at a pH 1–2.5 a solution of rare earth sulfates in which the solubility of europous sulfate is not sufficiently low for a substantial portion of europous sulfate to precipitate therefrom, said solution having a concentration of rare earth sulfates equivalent to 50–75 grams of rare earth oxides per liter and containing europium values and being substantially free of heavy metals which interfere with the reduction by zinc dust of europium to the europous state with zinc dust in an amount sufficient to reduce said europium values to europous form and with an alkali metal sulfate elected from the group consisting of sodium sulfate and potassium sulfate in an amount sufficient to precipitate between about 5 and 10% of said rare earths in the form of rare earth-alkali metal-double sulfates, thereby precipitating said part of said rare earths in the form of rare earth-alkali metal-double sulfates and coprecipitating said europium values in the form of europous sulfate with said part of said rare earth-alkali metal-double sulfate; and recovering a product containing an increased percentage of europium values as compared to the percentage of europium values in said original europium-containing mixture.

6. In a method of recovering europium values from low grade europium-containing mixtures with other rare earths wherein the amount of europium values is small relative to the other rare earths, the steps of treating at a pH of 1–2.5 a solution of rare earth sulfates in which the solubility of europous sulfate is not sufficiently low for a substantial portion of europous sulfate to precipitate therefrom, said solution having a concentration of rare earth sulfates equivalent to 50–75 grams of rare earth oxides per liter and containing europium values and being substantially free of heavy metals which interfere with the reduction by zinc dust of europium to the europous state with zinc dust in an amount of between 2 and 4 grams per liter of solution and sufficient to reduce said europium values to europous form and with an alkali metal sulfate elected from the group consisting of sodium sulfate and potassium sulfate in an amount sufficient to precipitate between about 5 and 10% of said rare earths in the form of rare earth-alkali metal-double sulfates, thereby precipitating said part of said rare earths in the form of rare earth-alkali metal-double sulfates and coprecipitating said europium values in the form of europous sulfate with said part of said rare earth-alkali metal-double sulfate; and recovering a product containing an increased percentage of europium values as compared to the percentage of europium values in said original europium-containing mixture.

References Cited in the file of this patent

McCoy: "Journal of the American Chemical Society," vol. 58, November 1936, pages 2279–2281.

Vickery: "Chemistry of the Lanthanons," Academic Press, Inc., N.Y., 1953, pages 75, 76, 87–92, 132–140, 182–185 and 234.

Yost, D. M., et al.: "The Rare Earth Elements and Their Compounds," John Wiley & Sons, Inc., 1947, page 43.